A. C. SANFORD.
REAPER.
APPLICATION FILED NOV. 16, 1915.
1,259,465.
Patented Mar. 12, 1918.
2 SHEETS—SHEET 1.
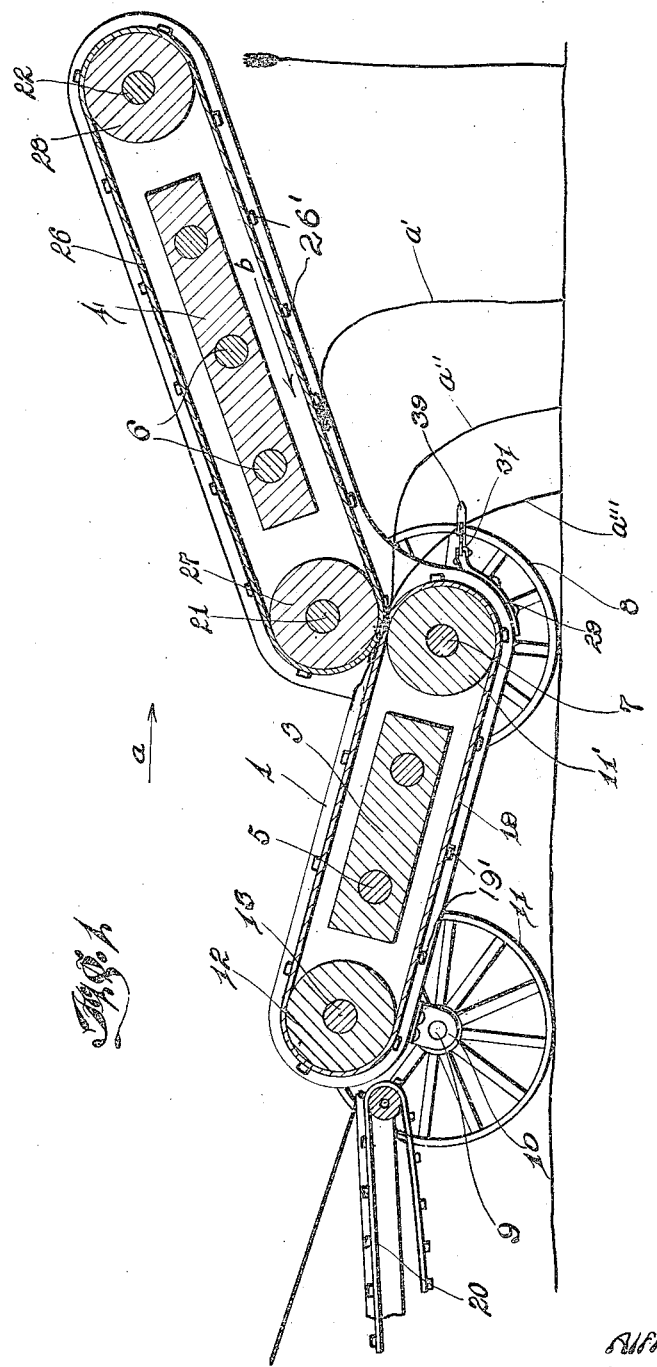
Inventor
Alfred C. Sanford
By Herbert E. Smith
Attorney

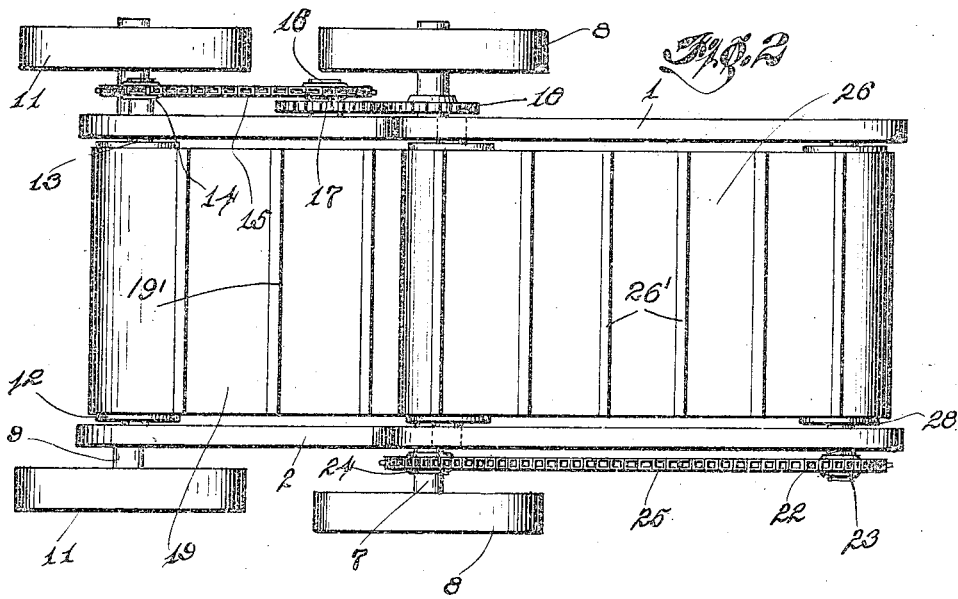
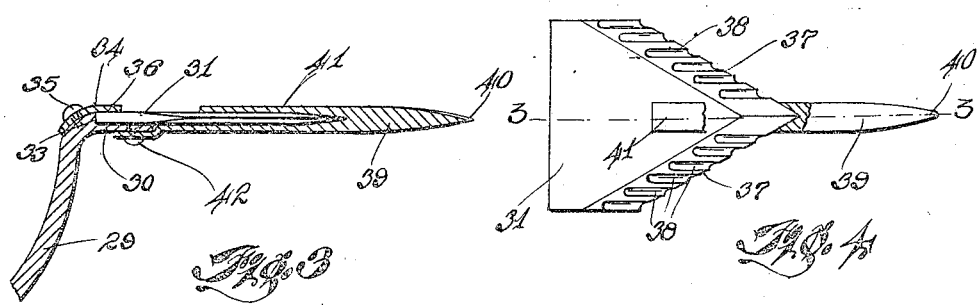
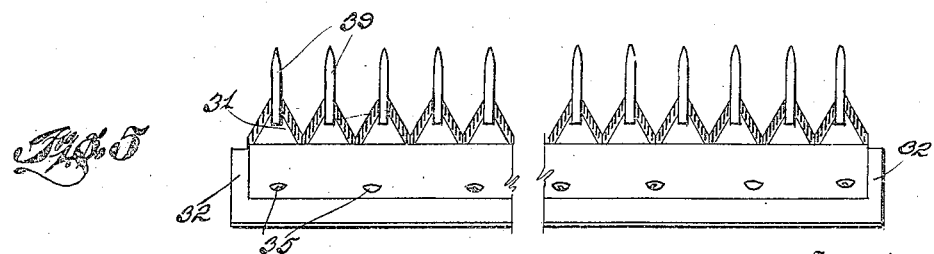

UNITED STATES PATENT OFFICE.

ALFRED C. SANFORD, OF GRANGEVILLE, IDAHO.

REAPER.

1,259,465.

Specification of Letters Patent.  Patented Mar. 12, 1918.

Application filed November 16, 1915. Serial No. 61,757.

*To all whom it may concern:*

Be it known that I, ALFRED C. SANFORD, a citizen of the United States, residing at Grangeville, in the county of Idaho and State of Idaho, have invented certain new and useful Improvements in Reapers, of which the following is a specification.

This invention relates to improvements in reapers and one of the principal objects of the invention is to accomplish a saving of stalk heads which has heretofore been impossible with reapers now known.

One of the important features of the invention consists in an improved method and mechanism whereby the head ends of the stalks are grasped and held prior to, and also preferably during the severing operation by the knife, thereby insuring delivery of the head of the stalk, containing the grain berries, irrespective as to whether or not the grain is high or low, or whether it is thick or thin. In all kinds of reapers and binders known to applicant, the agitation to which the standing grain is subjected in the operation of heading the same is such that a great many stalks fly forwardly of the sickle after being cut, notwithstanding the action of a reel or other devices now used for discharging the cut stalks upon the draper.

A further important feature of the invention consists in providing means whereby the head ends of the stalks are bent downwardly, in advance of the cutting means, and are gradually projected into range of gripping mechanism so that they will be grasped and held prior to the cutting operation.

A further and very important feature of the invention consists in providing gripping mechanism which is rotatable and which is constructed so as to function as a take-up, such mechanism being operated at a speed necessary to hold the stalk taut, without uprooting the same, prior to the cutting operation, so that when this stalk comes in contact with the cutting means it will be more effectively severed.

Because of the previously named features, I have found it possible, and I consider it a point of important novelty in my invention, to use a cutting means which is not reciprocated or otherwise actuated but which functions to sever the stalks by reason of the fact that the stalks are held taut when the cutting means comes into engagement therewith.

Other features of novelty will be more fully described in connection with the accompanying drawings and will be more particularly pointed out in and by the appended claims.

In the drawings:—

Figure 1 is a longitudinal vertical sectional view of my improved reaper.

Fig. 2 is a plan view thereof.

Fig. 3 is a sectional view on line 3—3 of Fig. 4 showing the construction of the cutting means.

Fig. 4 is a plan view of one unit of the cutting means.

Fig. 5 is a plan view of the cutting means on a reduced scale.

Like characters of reference designate similar parts throughout the different figures of the drawings.

As illustrated, my invention includes a frame composed of side members 1 and 2 which may be braced and suitably connected by transverse frame blocks 3 and 4. The blocks 3 and 4 may be bolted to the frame sides, as indicated at 5 and 6. A front axle 7 is suitably journaled in the frame and bearing wheels 8 are mounted on said axle. A rear axle 9 is journaled to the frame in boxes 10 and I provide bearing wheels 11 which are mounted on the rear axle 9 so as to support the machine in the position shown in Fig. 1.

A roller 11' is loose upon axle 7 and a roller 12 is fixed upon a spindle 13. Spindle 13 is journaled in the frame and carries a sprocket wheel 14 over which a sprocket chain 15 is trained. Sprocket chain 15 is trained around a sprocket wheel 16 which may be formed integral with a gear wheel 17. Gear wheel 17 and sprocket wheel 16 are mounted in any suitable manner as by a stub shaft so that gear wheel 17 will mesh with gear wheel 18. Gear wheel 18 is mounted upon axle 7 and it will now be clear that rotation of bearing wheels 8 and axle 7, in a clockwise direction, will transmit rotary drive to spindle 13 in a contra-clockwise direction.

A conveying apron of the endless type, as indicated at 19, is trained about rollers 11 and 12 so as to convey the headed grain rearwardly with respect to the direction of advancement of the machine, as indicated by arrow A, so as to discharge upon a conveyer 20 which is merely indicated as a point of deposition. The device of my invention may be combined with threshing machines such as is shown in my application filed November 12, 1915, Serial Number 61,286.

A spindle 21 is journaled in the frame sides, preferably in superposed relation with axle 7, and at the forward end of the frame I journal spindle 22 on which is mounted a sprocket wheel 23. On axle 7 is a sprocket wheel 24 and a sprocket chain 25 serves to drive spindle 22 from axle 7 in a clockwise direction. A deflecting mechanism, including an endless apron 26, is trained about rollers 27 and 28 which are mounted on spindles 21 and 22, respectively, the roller 28 being fixed on spindle 22. With the foregoing drive transition, the lower lap of apron 26 will travel in the direction of arrow B.

Cutting means is employed which may consist of an arcuate strip 29, fixed to the frame of the machine, and provided with a recessed seat 30 to receive knife sections. A plurality of knife sections 31 is disposed in said seat in lateral abutting relation and I provide end flanges 32 for holding said knife sections against lateral displacement. The knife sections 31 abut against the shoulder 33 and a plurality of spring strips, as indicated at 34, one for each knife section, may be mounted on support 29 as indicated at 35 so as to overlap the knife sections as shown at 36. These spring retainers will act to hold the knife sections 31 in position, as regards any displacement which would otherwise result from rear or upward thrust.

It is a feature of my invention to employ knife sections having forwardly converging knife edges or margins 37, the said margins being provided with longitudinally extending serrations 38 in such a manner that as the stalk is held taut for the knife to advance against the stalk, the stalk will pass along the serrated knife edge and will be subjected to a shearing cut to complete severance of the stalk, as will hereinafter more fully appear.

In order to protect the knife blade against accidental contact against stone, stumps or the like, I provide guard fingers 39 which taper to points 40. The guard fingers 39 overhang the knife sections 31, as indicated at 41, and the lower portions of the guards extend beneath the knife sections and are secured at 42 to the support 29. An additional function of the guards 39 is to hold the knife sections 31 in their recess and against any forward displacement. It will be noted that the cutting means is disposed somewhat below the point of contact of the aprons 19 and 26, at the juncture of the rollers 11 and 27.

In operation, the machine is advanced toward the standing grain in the direction of arrow $a$. The inclined lower lap of the apron 26, which constitutes deflecting mechanism, first engages the heads of the standing grain as indicated at $a'$, and bends down the stalks so that the heads are directed toward the line of juncture of the apron 26 with the apron 19. The belt 26 is geared to rotate at a sufficient speed so that notwithstanding its advancing movement, it will bend the stalks down in the manner shown. To render the apron 26 more efficient, I may provide the latter with canvas or other form of cleat, as shown in Figs. 1 and 2. As the machine advances, the head ends of the stalks will first be engaged by the aprons 26 and 19, as shown for instance in connection with stalk $a''$. This portion of the mechanism functions as a gripping mechanism, the aprons 19 and 26 coacting to perform this function. As the machine further advances, the increased rotation of the aprons with respect to the surface speed of the machine is such that the stalk $a'''$ will have been pulled taut as the machine advances and held at one end by its roots and at the other end by the said gripping mechanism. At this period in the operation, one of the knife sections 31 will have engaged the stalk and because the latter is pulled taut, it will be sheared by the inclined knife edges 37 and the continued rotation of the rollers, actuating the aprons, will convey the severed stalks to the left of Fig. 1 so that the stalks will be delivered to a point of deposition, such as a conveyer 20.

By reason of the fact that the stalk is held at its root end and at its head end I am able to sever the stalk by a knife means which is rigid and I therefore avoid all of the objections resulting from the use of a reciprocating sickle bar.

I consider it a feature of great importance to provide means which deflects the standing grain in a direction opposite to the direction of travel, into range of action of a gripping mechanism, for the purpose of gripping the head end of the standing grain before the stalk thereof has been severed, this phase of the invention being considered by me as being novel, both as a mechanism and as a method.

It is believed that my invention will be clearly understood from the foregoing description, and while I have herein shown and described one specific form of my invention, I do not wish to be limited thereto except for such limitations as the claims may import.

I claim:—

1. In a traveling reaper for grain having flexible stalks, mechanism for first positively gripping the heads and then the stalks and advancing the latter rearwardly with respect to the direction of travel of the reaper, cutting means in the path of the stalks, and mechanism for deflecting the stalks downwardly into range of said gripping mechanism prior to severance of the stalks by said cutting means whereby the stalks will be held by their roots and the gripping means while being severed, substantially as described.

2. In a traveling reaper for grain having flexible stalks, mechanism for first positively gripping the heads and then the stalks and advancing the latter rearwardly with respect to the direction of travel of the reaper, cutting means in the path of the stalks, and mechanism for deflecting the stalks downwardly into range of the gripping mechanism prior to severance of the stalks by the cutting means whereby the stalks will be held by their roots and by said gripping means during severance, said gripping mechanism including a conveyer for conveying the severed stalks, substantially as described.

3. In a traveling reaper for grain having flexible stalks, mechanism for first positively gripping the heads and then the stalks and advancing the latter rearwardly with respect to the direction of travel of the reaper, cutting means in the path of the stalks, and an endless traveling deflector for deflecting the stalks downwardly into the range of said gripping mechanism prior to severance of the stalks by said cutting means, substantially as described.

4. In a traveling reaper for grain having flexible stalks, mechanism for positively gripping the heads and then the stalks and advancing the latter rearwardly with respect to the direction of travel of the reaper and including a traveling deflector for deflecting the stalks downwardly into range of said gripping mechanism, cutting means for cutting the stalks while the latter are held by their stalks and the gripping mechanism, substantially as described.

5. In a traveling reaper for grain having flexible stalks, coacting rollers forming gripping mechanism, an endless apron deflector trained about one of said rollers, a deflector roller supporting said apron forwardly of and at an upward inclination from said rollers to cause said deflector apron to deflect the stalks downwardly into range of said gripping mechanism, cutting means for severing the stalks after the latter have been gripped, and an endless apron trained about the remaining roller and extending rearwardly to convey the severed stalks to a point of deposition, substantially as described.

6. In a traveling reaper for flexible stalked grain, cutting means, and mechanism for first gripping the heads and then the stalks and advancing the latter rearwardly with respect to the direction of travel of the reaper to hold the stalks taut between their roots and said mechanism prior to and during severance by said cutting means, substantially as described.

In testimony whereof I affix my signature.

ALFRED C. SANFORD.

Copies of this patent may be obtained for five cents each, by addressing the "Commissioner of Patents, Washington, D. C."